(12) United States Patent  (10) Patent No.: US 8,021,479 B2
Mohr et al.  (45) Date of Patent: Sep. 20, 2011

(54) PLANT AND METHOD FOR THE PRODUCTION OF CEMENT CLINKER FROM CEMENT RAW MATERIAL

(75) Inventors: Markus Mohr, Dülmen (DE); Christoph Beyer, Münster (DE)

(73) Assignee: Polysius AG, Beckum (DE)

( * ) Notice: Subject to any disclaimer, the term of this patent is extended or adjusted under 35 U.S.C. 154(b) by 797 days.

(21) Appl. No.: 12/066,110

(22) PCT Filed: Aug. 25, 2006

(86) PCT No.: PCT/EP2006/008362
§ 371 (c)(1),
(2), (4) Date: Mar. 7, 2008

(87) PCT Pub. No.: WO2007/033749
PCT Pub. Date: Mar. 29, 2007

(65) Prior Publication Data
US 2008/0245275 A1  Oct. 9, 2008

(30) Foreign Application Priority Data
Sep. 20, 2005 (DE) .................. 10 2005 044 840

(51) Int. Cl.
C04B 7/43 (2006.01)
(52) U.S. Cl. ..................... 106/739; 432/14; 432/58
(58) Field of Classification Search ............. 432/14, 432/58; 106/739
See application file for complete search history.

(56) References Cited

FOREIGN PATENT DOCUMENTS
DE 196 27 660 1/1998
EP 1 337 954 A1 8/2003
JP 2000 264687 9/2000

*Primary Examiner* — Paul Marcantoni
(74) *Attorney, Agent, or Firm* — Gifford, Krass, Sprinkle, Anderson & Citkowski, P.C.

(57) ABSTRACT

The invention relates to a device and a method for producing clinker from raw cement material. The raw cement material is preheated in a preheater, is precalcined in a calcining apparatus, is completely burned in a sintering furnace, and is finally cooled in a cooler. Tertiary air of the cooler is fed to the calcining apparatus while eliminated dust is thermally treated in a dust burning reactor with the aid of combustion air and fuel. At least some of the tertiary air is fed to the dust burning reactor as combustion air while the dust that is to be treated and the combustion air penetrate the dust burning reactor in the same direction of flow.

10 Claims, 2 Drawing Sheets

PLANT AND METHOD FOR THE PRODUCTION OF CEMENT CLINKER FROM CEMENT RAW MATERIAL

Figure 1:
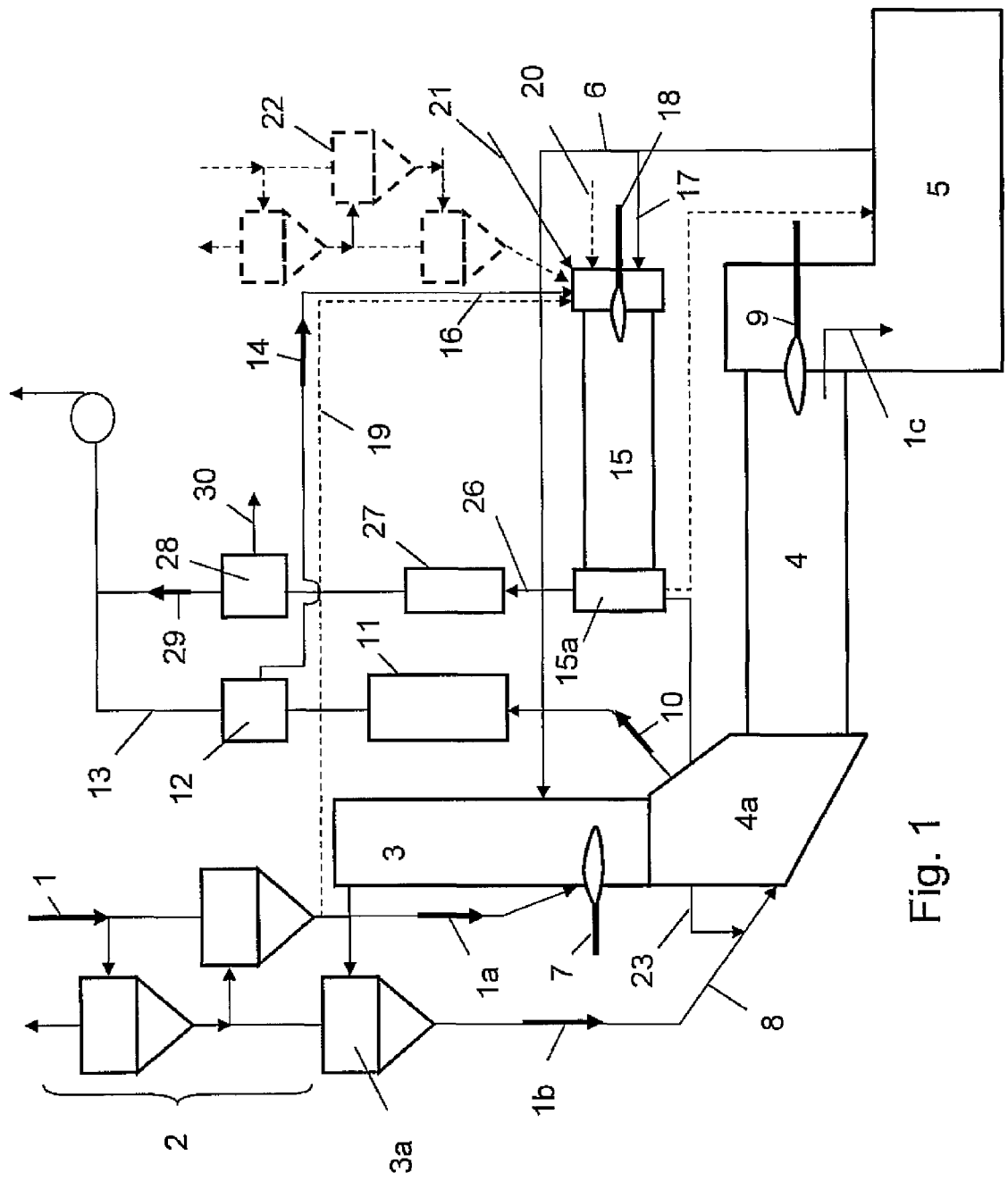

The invention relates to a plant and to a method for the production of cement clinker from cement raw material, the cement raw material being preheated in a preheater, precalcined in a calcining apparatus and completely burned in a sintering kiln and finally cooled down in a cooler.

The dusts accumulating in certain treatment zones during the production of cement are mostly partially returned to the cement production process again. But there are dusts or types of dust that for various reasons can no longer be utilised for the cement production process. An especially typical case arises from the fact that raw materials and fuels for the production of cement mostly comprise constituents of chlorides, alkalis and sulphur compounds, which become readily volatile at the relatively high treatment temperatures. This gives rise to what are known as harmful substance circulations, which can seriously disrupt operation of the plant.

It is known to extract some of the waste gases of the sintering kiln by means of what is called a bypass and to quench them in a cooling zone, during which process the harmful substances attach to the dust particles. The dust, together with the harmful substances, is then separated off.

DE-A-196 27 660 discloses a method by which largely all deposited dusts accumulating in the cement production process, in particular also the previously mostly discharged dust components of bypass ducts and/or dusts otherwise discarded, can likewise be used for the production of cement.

That publication proposes that the dusts separated from extracted hot treatment gases are heat-treated in a separate dust combustion reactor, and thereafter the burned dust material is cooled down in the cooling zone jointly with the cement clinker burned in the sintering kiln. Exhaust air of the cooler is used in the known process as combustion air, and is conveyed in counter-current flow to the dusts to be heat-treated. In this manner the dusts undergo an optimum heat treatment.

The harmful substances clinging to the dusts are released again by the heat treatment and subsequently pass with the exhaust gas into a separate cooling zone and also into a separation zone.

In this known process, however, there is the difficulty that because the exhaust gases of the dust reactor are charged with harmful substances, undesirable build-ups occur before the exhaust gases reach the quenching zone. The second difficulty is that the composition of the bypass dust is "difficult" to combust and the rotary kiln is subjected to a double burden, namely a heat treatment of the dust with the expulsion of chlorine and the combustion of the material to form cement clinker. This means that the product conveyed to the cooler must have a perfect clinker quality.

The problem underlying the invention is to specify a plant and a method for the production of cement clinker from cement raw material, in which the problem of build-ups from the exhaust gases of the dust combustion reactor can be largely avoided and in addition the burden on the kiln is reduced.

According to the invention this problem is solved by the features of claims 1 and 8.

The plant according to the invention for the production of cement clinker from cement raw material essentially comprises a preheater for preheating the cement raw material, a calcining apparatus for precalcining the preheated cement raw material, a sintering kiln for completely burning the precalcined cement raw material to cement clinker and a cooler for cooling down the hot cement clinker. Between the cooler and the calcining apparatus there is provided a tertiary air duct, via which tertiary air is supplied to the calcining apparatus. Furthermore, a dust combustion reactor for heat-treating separated dusts is provided, which comprises means for supplying the dust, means for supplying combustion air and means for supplying fuel.

The cooler is connected in such a way to the means for supplying combustion air that at least a part of the tertiary air is conveyed to the dust combustion reactor as combustion air and the means for supplying the dust and the means for supplying combustion air are arranged so that the dusts to be treated and the combustion air pass through the dust combustion reactor in co-current flow.

In the method according to the invention for the production of cement clinker from cement raw material, the cement raw material is preheated in a preheater, precalcined in a calcining apparatus and completely burned in a sintering kiln and finally cooled down in a cooler. In the process, tertiary air of the cooler is fed to the calcining apparatus and separated dusts are heat-treated with the aid of combustion air and fuel in a dust combustion reactor. At least a part of the tertiary air is conveyed to the dust reactor as combustion air, and the dusts to be treated and the combustion air are conveyed so that they pass through the dust combustion reactor in co-current flow.

Owing to the fact that the dusts to be treated and the combustion air pass through the dust combustion reactor in co-current flow, the exhaust gas of the dust combustion reactor is no longer cooled down by the cooler dusts conveyed in counter-current. The harmful substances thus remain in the exhaust gas and not until a subsequent cooling zone is reached are they deposited on entrained dust particles.

The so-called "tertiary air" is that part of the exhaust air of the cooler that has a temperature in the range from 400° C. to 900° C. and is fed to the calcining apparatus. It is relatively hot air, which is used as combustion air in the calcining apparatus. According to the invention, a part of this tertiary air is diverted and fed to the dust combustion reactor as combustion air. The relatively high temperature level of the tertiary air enables the heat treatment of the dusts in the dust combustion reactor to take place in a temperature range from 1100° C. to 1600° C.

Further embodiments of the invention form the subject matter of the subsidiary claims.

The dust heat-treated in the dust combustion reactor is returned to the cement production process, the dust being added in particular to the precalcined cement raw material or to the cement raw material to be cooled.

The calcining apparatus is normally connected to the sintering kiln via a meal chute. In accordance with an especially advantageous embodiment, the dust reactor has an outlet that is connected to the meal chute, so that the dust heat-treated in the dust reactor passes together with the precalcined cement raw material via the meal chute into the sintering kiln.

Within the scope of the invention it is also conceivable for the heat-treated dust to be supplied in the region of the entry area of the sintering kiln. In that case, it must be ensured that part of the exhaust gases does not pass from the dust combustion reactor into the calcining apparatus, as the resulting "short circuiting" would render control of the whole kiln process impossible.

If the heat-treated dust of the dust combustion reactor is conveyed to the sintering kiln via the meal chute, there is a clear separation between the exhaust gases of the two kilns. In this manner, the dusts can be returned without adversely affecting operation of the plant in the region of the calcining apparatus.

Normally, the dust to be heat-treated comes from a bypass system, which extracts a part of the exhaust gases of the sintering kiln and subsequently conveys it to a cooling zone and a separation zone. The dust accumulating in the separation zone is then fed to the dust combustion reactor. The exhaust gases accumulating in the dust combustion reactor can be conveyed either to the cooling and separation zone of the bypass system or to separate cooling and separation zones. In addition, it is possible to provide a respective cooling zone for the diverted exhaust gases of the sintering kiln and the exhaust gases of the dust combustion reactor, as well as a common separation zone. In the first and third cases, part of the separated dusts would have to be discharged from time to time, so that the circulations of harmful substance are interrupted. In the second case, the dust of the exhaust gas separated in the separate separation zone would be discharged and disposed of.

Figure 2:
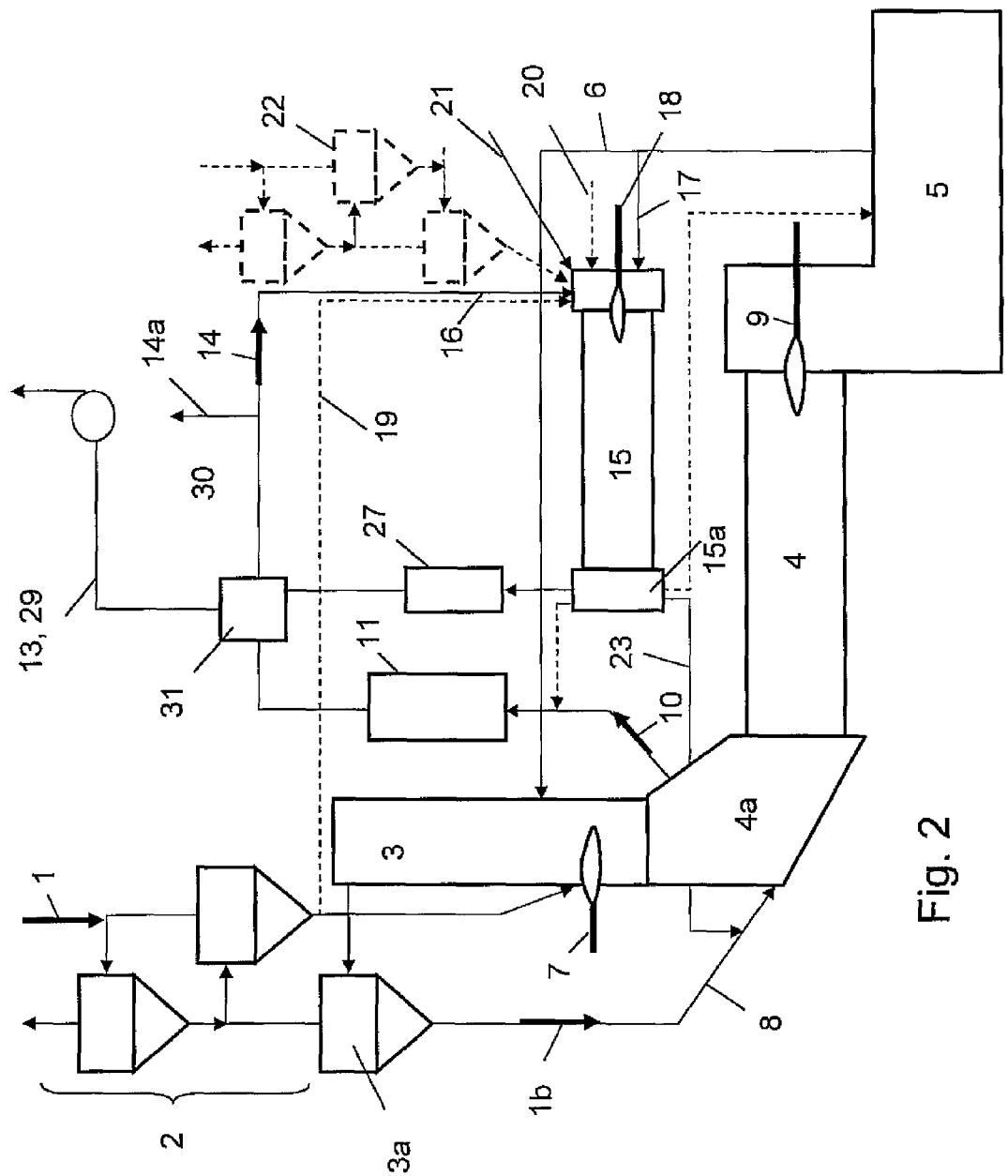

Further advantages and an embodiment of the invention are explained in detail hereafter by means of the description and the drawings, in which:

FIG. 1 shows a schematic representation of a first exemplary embodiment of a plant according to the invention, and FIG. 2 shows a schematic representation of a second exemplary embodiment of a plant according to the invention.

The plant illustrated in FIG. 1 for the production of cement clinker from cement raw material 1 essentially comprises a preheater 2 for preheating the cement raw material, a calcining apparatus 3 for precalcining the preheated cement raw material 1a, a sintering kiln 4 for complete burning of the precalcined cement raw material 1b to cement clinker and a cooler 5 for cooling down the hot cement clinker 1c.

A tertiary air duct 6, via which tertiary air is supplied to the calcining apparatus, is provided between the cooler 5 and the calcining apparatus 3.

The cement raw material 1 is fed in in the upper region of the preheater 2 and passes through the preheater in counter-current flow to the exhaust gases of the sintering kiln 4 flowing through the preheater.

The preheated cement raw material 1a is then supplied to the calcining apparatus 3 in order to be precalcined there while adding fuel via the burner 7 and tertiary air via the duct 6. The exhaust gases of the sintering kiln 4 also advantageously flow through the calcining apparatus 3.

The precalcined cement raw material 1b is separated from the exhaust gases in a cyclone 3a and arrives in the sintering kiln 4 via a meal chute 8 and a kiln inlet 4a. The sintering kiln 4 is advantageously in the form of a rotary kiln, which is fired by way of a burner 9 arranged at its outlet.

The hot cement clinker 1c burned in the sintering kiln finally arrives in the cooler 5 and is cooled down there. The hot cooling air generated during cooling is fed as tertiary air via the duct 6 to the calcining apparatus 3.

The harmful substances contained in the cement raw material, such as chlorides, alkalis and sulphur compounds, are released under the conditions prevailing in the sintering kiln and directed with the exhaust gas into the calciner 3. There, the exhaust gas cools down so that the harmful substances condense on the cement raw material. To interrupt this circulation of harmful substances, it is generally well known to divert a part of the exhaust gases of the sintering kiln via what is called a bypass.

Also in the exemplary embodiment illustrated, a part 10 of the exhaust gases of the sintering kiln 4 is diverted in the region of the kiln inlet 4a and subsequently fed to a cooling zone 11 and a separation zone 12. In the cooling zone 11, the exhaust gas is "quenched", so that the harmful substances condense on the entrained dust particles. In the separation zone 12, the gaseous phase is then separated from the dust particles with the attached harmful substances. The gaseous phase 13 developing during this process is discharged, for example, via an exhaust gas flue. The separated dusts 14 are fed to a dust combustion reactor 15.

The dust combustion reactor 15 is preferably likewise in the form of a rotary kiln. It has means 16 for supplying the separated dusts 14, means for supplying combustion air and means 18 for supplying fuel, wherein the dust combustion reactor can be charged at least to some extent with derived fuels. The cooler 5 is connected via a branch in the tertiary air duct 6 to the means 17 for supplying combustion air. In this manner, tertiary air is likewise supplied to the dust combustion reactor 15. The means 16 for supplying the separated dusts 14 and the means 17 for supplying combustion air are arranged so that the dusts 14 to be treated and the combustion air pass through the dust combustion reactor 15 in co-current flow.

In addition to the separated dusts 14, it would be also possible to supply a part of the preheated cement raw material 1a via a duct 19 to the dust combustion reactor 15. Furthermore, oxygen-rich combustion air can additionally be introduced via means 20 and further dust via means 21 into the dust combustion reactor.

Within the scope of the invention it is also possible for the dusts to be treated in the dust combustion reactor 15 to be first preheated in an additional preheater 22.

In the drawing, this preheater 22 is indicated by a broken line. Alternatively, it is possible that the bypass dust removed from the kiln system is charged "online" and is thus already preheated.

The dust combustion reactor 15 has an outlet 15a, which is connected to the meal chute 8 via the duct 23, so that the dust heat-treated in the dust combustion reactor arrives in the sintering kiln 4 together with the precalcined cement raw material 1b via the meal chute.

The exhaust gas 26 is "quenched" in a second cooling zone 27, resulting in condensing of the harmful constituents on the entrained dust particles. In a downstream second separation zone 28, the exhaust gas is separated into a gaseous phase 29 and dust 30. The gaseous phase 29 can then be discharged together with the gaseous phase 13. The dust 30 charged with harmful substances is advantageously disposed of. It is possible, however, for at least a part of this dust 30 to be supplied to the dust combustion reactor 15 again.

FIG. 2 illustrates a second exemplary embodiment of a plant, which essentially differs only in the bypass system and the treatment of the exhaust gases of the dust combustion reactor 15.

In the exemplary embodiment illustrated, two separate separation zones are not provided, instead, a common separation zone 31 is provided. The partial flow 10 of exhaust gas of the sintering kiln 4 is thus treated in the cooling zone 11 and the common separation zone 31. The exhaust gas of the dust combustion reactor can be supplied either also to the cooling zone 11 and subsequently to the common separation zone 31, or via a separate cooling zone 27 to the separation zone 31. The dust 14 separated in the common separation zone 31 is supplied in turn to the dust combustion reactor 15, whilst the gaseous phase 13, 29 is discharged. In order to interrupt the circulations of harmful substances, however, a part 14a of the separated dusts 14 must be discharged from time to time.

The heat-treatment of the dusts 14 in the dust combustion reactor 15 is effected preferably at a temperature in the range from 1100° C. to 1600° C., the dwell time of the dusts in the dust combustion reactor being between 5 and 30 minutes. The dust combustion reactor 15 is advantageously controlled by way of the temperature and/or the oxygen content at the outlet 15a of the dust combustion reactor.

The above described plants and the method are distinguished by the fact that dusts accumulating during the cement production process can be very efficiently and economically returned to the cement production process, harmful substances such as chlorides and alkalis being discharged at the same time.

The invention claimed is:

1. A plant for the production of cement clinker from cement raw material, having
    a. a preheater for preheating the cement raw material,
    b. a calcining apparatus for precalcining the preheated cement raw material,
    c. a sintering kiln for completely burning the precalcined cement raw material to cement clinker and
    d. a cooler for cooling clown the hot cement clinker,
    e. wherein between the cooler and the calcining apparatus there is provided a tertiary air duct, via which tertiary air is supplied to the calcining apparatus, and
    f. a dust combustion reactor for heat-treating separated dusts, having means for supplying the dust, means for supplying combustion air and means for supplying fuel, wherein the cooler is connected in such a way to the means for supplying combustion air that at least a part of the tertiary air is supplied to the dust combustion reactor as combustion air and the means for supplying the dust and the means for supplying combustion air are arranged so that the dusts to be treated and the combustion air pass through the dust combustion reactor in co-current flow and the calcining apparatus is connected to the sintering kiln via a meal chute and the dust reactor has an outlet that is connected to the meal chute, so that the dust preheated in the dust reactor reaches the sintering kiln together with the precalcined cement raw material via the meal chute.

2. The plant according to claim 1, characterised in that the dust reactor has an outlet that is connected to the sintering kiln, so that the dust heat-treated in the dust reactor reaches the sintering kiln.

3. The plant according to claim 1, characterised in that the dust reactor has an outlet that is connected to the cooler, so that the dust heat-treated in the dust reactor reaches the cooler.

4. The plant according to claim 1, characterised in that an additional preheater for preheating the dusts to be treated is located upstream of the dust combustion reactor.

5. The plant according to claim 1, characterised by a bypass for extracting part of the exhaust gas from the sintering kiln, with a cooling zone for cooling the exhaust gas and a separation zone for separating the dust contained in the exhaust gas, wherein the separation zone is connected to the dust combustion reactor for supplying the separated dusts.

6. The plant according to claim 1, characterised by a cooling zone for cooling the exhaust gas occurring in the dust combustion reactor and a separation zone for separating the dust contained in the exhaust gas.

7. A method for the production of cement clinker from cement raw material, wherein the cement raw material is preheated in a preheater precalcined in a calcining apparatus and completely burned in a sintering kiln and finally cooled down in a cooler, and wherein tertiary air of the cooler is supplied to the calcining apparatus and separated dusts are heat-treated by means of combustion air and fuel in a dust combustion reactor, wherein at least a part of the tertiary air is supplied as combustion air to the dust combustion reactor and the dusts to be treated and the combustion air are supplied such that they pass through the dust combustion reactor in co-current flow and the calcining apparatus is connected to the sintering kiln via a meal chute and the dust reactor has an outlet that is connected to the meal chute, so that the dust preheated in the dust reactor reaches the sintering kiln together with the precalcined cement raw material via the meal chute.

8. The method according to claim 7, characterised in that the heat treatment of the dusts in the dust combustion reactor is effected at a temperature in the range from 1100° C. to 1600° C. and the dwell time of the dusts in the dust combustion reactor is between 5 and 30 minutes.

9. The method according to claim 7, characterised in that a part of the exhaust gas is extracted from the sintering kiln into a bypass, cooled and dedusted, wherein the separated dust is supplied to the dust combustion reactor and the dust heat-treated in the dust combustion reactor is supplied to the precalcined cement raw material or to the cement raw material to be cooled.

10. The method according to claim 7, characterised in that the dust combustion reactor is charged at least to some extent with derived fuels.

* * * * *